(12) United States Patent
Grygorowicz et al.

(10) Patent No.: US 9,120,222 B2
(45) Date of Patent: Sep. 1, 2015

(54) COLLABORATIVE ROBOTIC EQUIPMENT

(75) Inventors: Serge Grygorowicz, Gy L'eveque (FR); Ludovic Surgot, Vermenton (FR)

(73) Assignee: ROBOTIQUES 3 DIMENSIONS, Auxerre (FR)

( * ) Notice: Subject to any disclaimer, the term of this patent is extended or adjusted under 35 U.S.C. 154(b) by 213 days.

(21) Appl. No.: 13/700,993

(22) PCT Filed: Jun. 1, 2011

(86) PCT No.: PCT/FR2011/000327
§ 371 (c)(1),
(2), (4) Date: Feb. 4, 2013

(87) PCT Pub. No.: WO2011/151544
PCT Pub. Date: Dec. 8, 2011

(65) Prior Publication Data
US 2013/0268120 A1    Oct. 10, 2013

(30) Foreign Application Priority Data
Jun. 1, 2010    (FR) ...................... 10 02313

(51) Int. Cl.
*B25J 1/02* (2006.01)
*B25J 13/08* (2006.01)
*B25J 9/04* (2006.01)

(52) U.S. Cl.
CPC .. *B25J 1/02* (2013.01); *B25J 9/042* (2013.01); *B25J 9/044* (2013.01); *B25J 13/085* (2013.01)

(58) Field of Classification Search
CPC ................. B25J 1/00; B25J 1/02; B25J 1/04; B25J 1/06; B25J 1/08; B25J 1/10; B25J 1/12; B25J 11/005; B25J 11/0055; B25J 11/006; B25J 11/0065; B25J 11/007; B25J 13/02; B25J 9/02; B25J 9/023; B25J 9/042; B25J 9/044; B25J 9/047; B25J 9/162; B25J 13/025; B25J 13/085; G05B 2219/33006
USPC .......................................................... 700/264
See application file for complete search history.

(56) References Cited

U.S. PATENT DOCUMENTS

| | | | |
|---|---|---|---|
| 4,408,286 A * | 10/1983 | Kikuchi et al. ............... | 700/260 |
| 5,269,644 A | 12/1993 | Vatel | |
| 5,865,426 A | 2/1999 | Kazerooni | |
| 6,204,619 B1 | 3/2001 | Gu et al. | |
| 6,477,448 B1 * | 11/2002 | Maruyama ..................... | 700/302 |
| 2003/0135303 A1 * | 7/2003 | Arai et al. ..................... | 700/245 |

FOREIGN PATENT DOCUMENTS

| | | |
|---|---|---|
| DE | 40 03 624 A1 | 10/1991 |
| DE | 44 15 518 A1 | 11/1995 |
| JP | 7 009372 A | 1/1995 |

* cited by examiner

*Primary Examiner* — Jerrah Edwards
(74) *Attorney, Agent, or Firm* — Arent Fox LLP

(57) ABSTRACT

The invention relates to collaborative robotic equipment comprising a supporting structure supporting an arm that can be moved along at least one axis and the end of which is equipped with a tool, wherein the arm comprises a first horizontal portion, movable on a vertical axis and connected to the supporting structure by a first pivot, a second pivot providing the rotary connection of a second horizontal portion to the first portion, an end fitting providing connection between the second portion and a motorized tool-holding linear actuator which is fitted with a manual-control stick collaborating with a main force sensor to control the vertical movement of the tool and amplify the manual effort.

10 Claims, 6 Drawing Sheets

COLLABORATIVE ROBOTIC EQUIPMENT

CROSS REFERENCE TO RELATED APPLICATION

Figure 1:
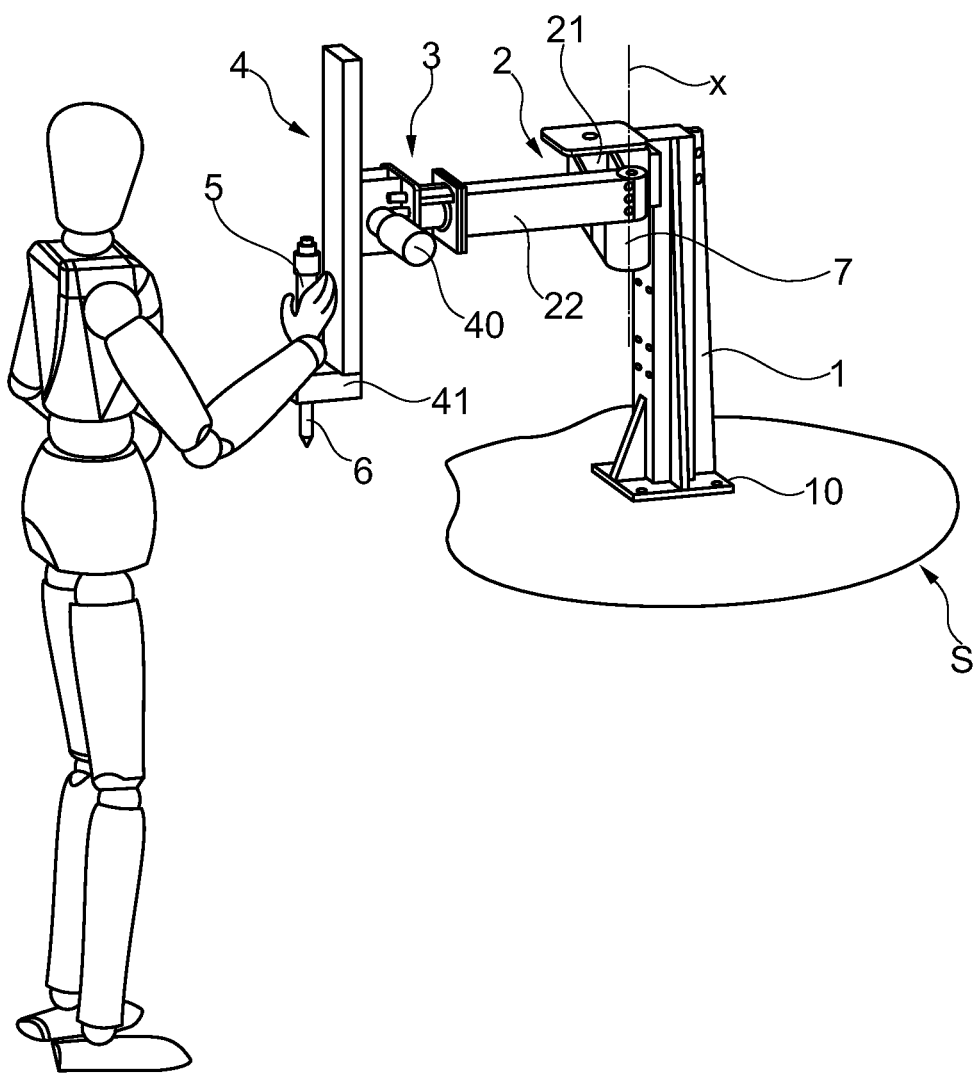

This application is a National Stage entry of International Application PCT/FR2011/000327, filed Jun. 1, 2011, which claims priority to French Patent Application No. 1002313, filed Jun. 1, 2010, the disclosure of the prior applications are hereby incorporated in their entirety by reference.

The present invention concerns collaborative robotic equipment.

More precisely, the invention relates to an improvement to tool-holding robots.

There exists a large number of robots capable of performing mechanical operations in a partially or completely automated manner.

These items of industrial robotic equipment are intended to pilot traditional tools and are generally controlled by microprocessors themselves controlled by software.

This equipment in general comprises a frame supporting at least one arm movable in space, the end of which is provided with a tool.

The total slaving of the tool to the robot makes it possible in particular to greatly increase the forces applied by the tool and to increase the work rates while keeping remarkable precision.

However, for some tasks, it may prove useful for the tool to remain controlled manually by an operating technician.

However, in this case, it is then necessary, for reasons of ergonomics and comfort, for the operator not to suffer excessive trauma or fatigue in controlling the tool because of the repeated forces that he must produce.

The aim of the present invention is to solve the technical problems disclosed above by producing an improved item of robotic equipment based on collaboration and synergy between the operator and the robot.

This aim is achieved, according to the invention, by means of equipment characterised in that said arm comprises a first horizontal portion able to move on a vertical axis and connected to the frame by a first pivot, a second pivot providing the rotary connection of a second horizontal portion to the first portion, an end fitting providing the connection of the second portion to a motorised tool-holding linear actuator fitted with a manual control chuck cooperating with a main force sensor for controlling the vertical movement of the tool and the amplification of the manual forces.

This equipment is called a "cobot" since it relates to "collaborative robotics", that is to say the conjoint intervention of man and machine.

According to an advantageous feature, the equipment of the invention comprises an auxiliary force sensor mounted between the actuator and the tool for controlling the forces amplified by said chuck.

According to another feature, the equipment comprises a first detector detecting the angular position of the first portion coupled to a second detector detecting the angular position of the second portion, said detectors being intended to validate the movement of the linear actuator.

Preferably, the first detector is coupled to braking members acting on the first and second pivots.

According to a particular variant, said connecting end fitting between the first portion and the actuator consists of a ball joint.

According to another variant, at least one of the first and second pivots is motorised in order to compensate for inertia of the portions and to cushion the amplified forces.

Provision is made for the arm to be equipped with a movement member secured to the frame.

For reasons of compactness, the movement member is coupled to a flexible transmission member.

According to a specific variant, said flexible transmission member comprises a set of two endless belts in engagement respectively with the first and second pivots and cooperating with the first and second portions.

Preferably, said frame consists of a pole provided with a fixing base.

The equipment of the invention enables tricky mechanical operations to be performed in which the technician keeps control of the process while benefiting from the collaborative assistance of the machine, in particular for applying high forces to very precise areas.

This equipment thus provides intuitive control of the tool while accompanying the actions of the operator as closely as possible and assisting him in his control.

Thus the operator is no longer sensitive to the inertia and weight of the tool-holder arm, which he keeps under his direct control, which enables him to concentrate on the precision of the task while having available high mechanical power.

Figure 2:
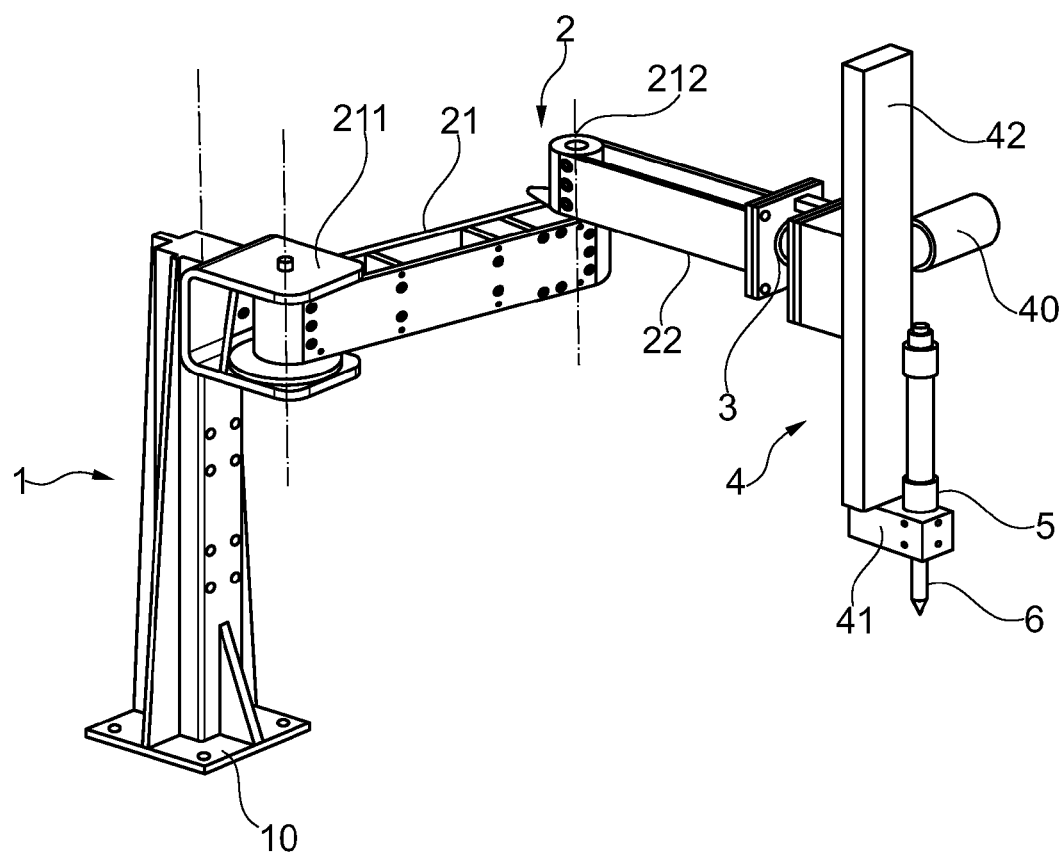
Figure 3:
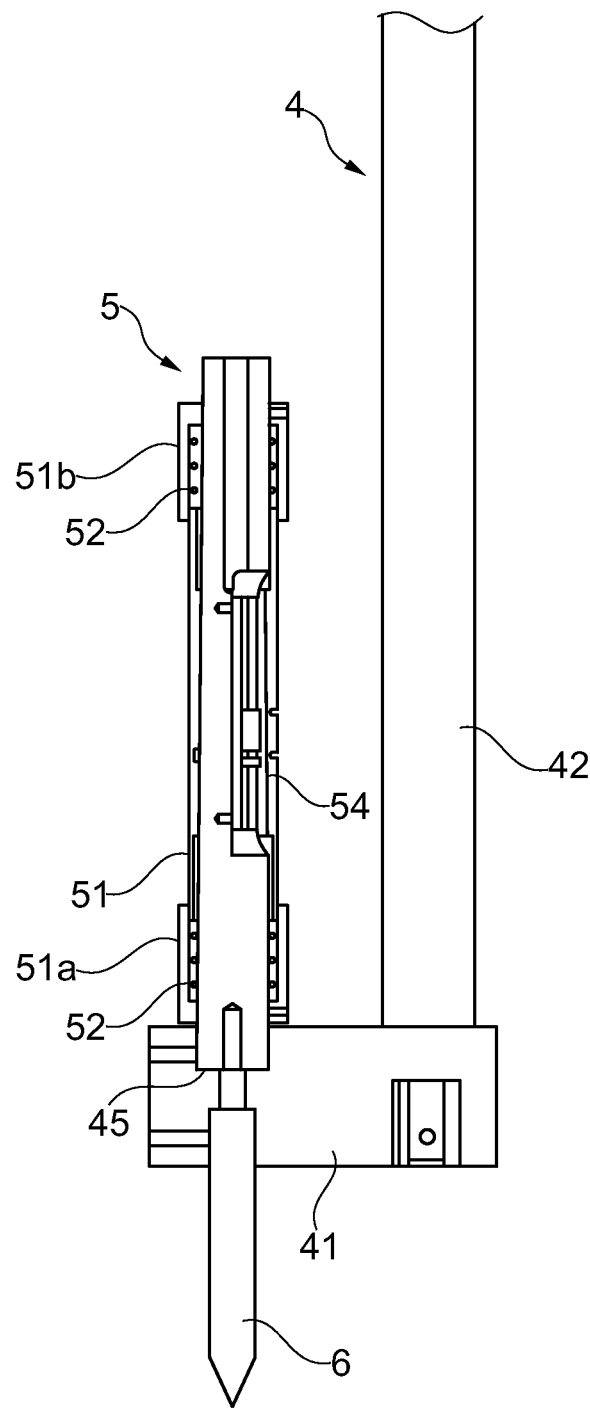
Figure 4:
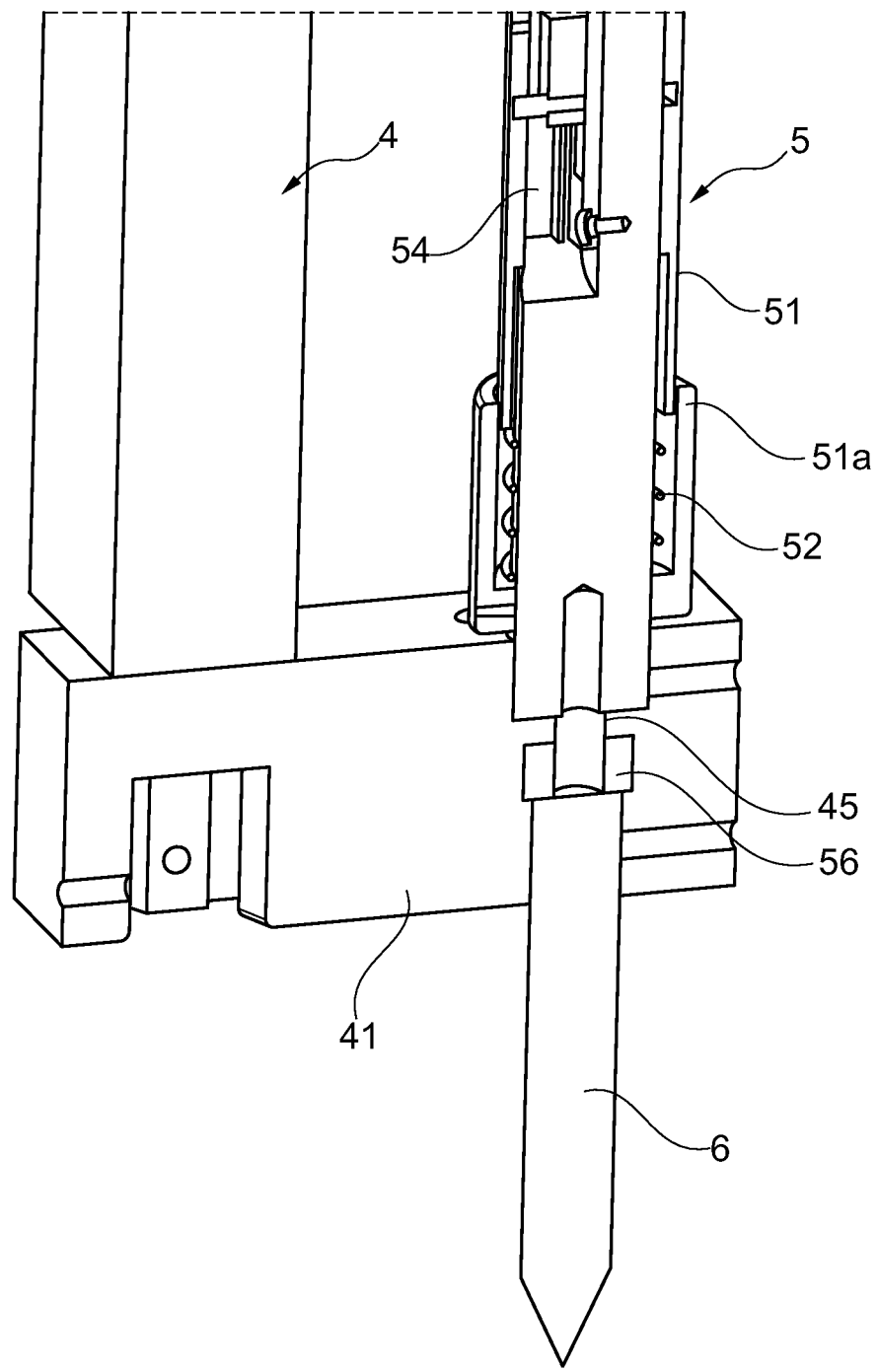
Figure 5:
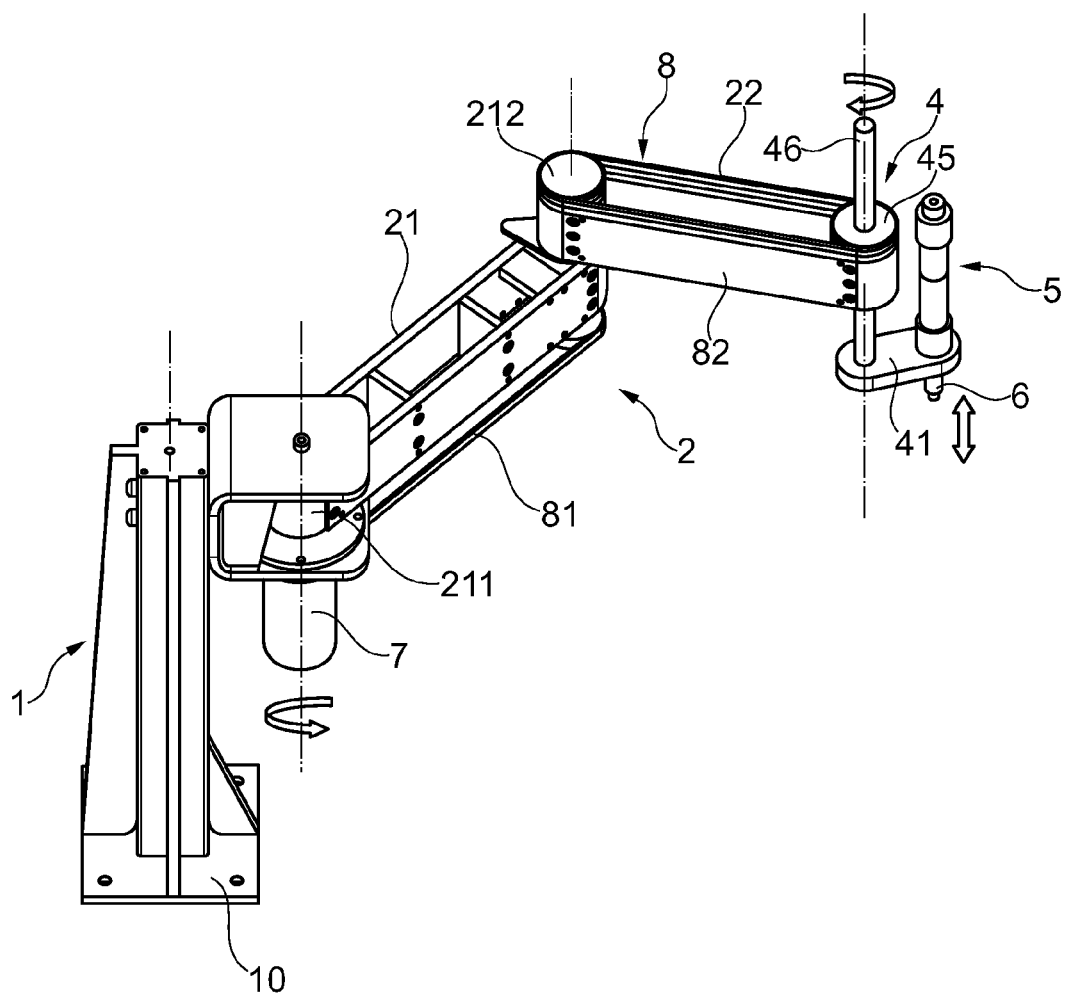
Figure 6:
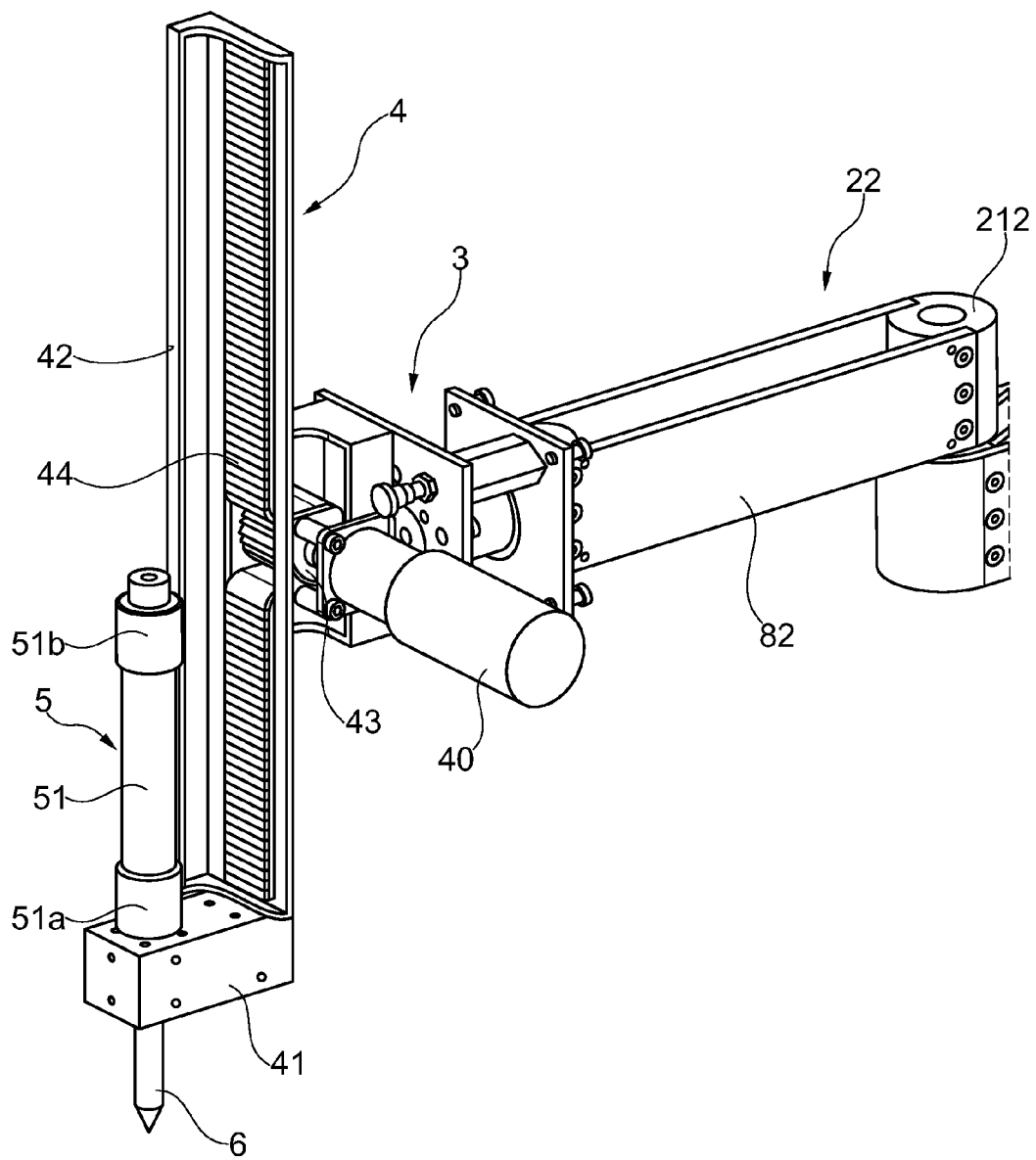

The invention will be better understood from a reading of the following description with reference to the accompanying drawings, in which:

FIG. 1 is a diagram showing an embodiment of the equipment of the invention being used by an operator, FIG. 2 is a perspective view of the equipment of FIG. 1, FIG. 3 is a lateral view in partial cross section of the equipment of the invention with its tool-holder actuator, FIG. 4 is a detail view in section of the actuator with the chuck and a tool, FIG. 5 shows a perspective view of the equipment with the driving members and the transmission members, FIG. 6 shows a partial view in perspective of the equipment with a variant actuator.

The equipment according to the invention, as shown in FIGS. 1 and 2, comprises a frame 1 supporting an arm 2 movable in space on at least one axis.

The frame 1 is here in the form of a vertical pole provided with a base 10 fixed to a support S so as to be accessible to an operator in the standing position.

The end of the arm 2 is provided with an end fitting 3 providing its connection to an actuator 4 with linear movement, here with a vertical axis, equipped with a tool-holder 41. The tool-holder is preferably in the form of a transverse seat on which is mounted, optionally removably, a tool 6 that, in the variant shown, consists of a punch.

The arm 2 comprises a first horizontal portion 21, movable in translation along a vertical axis X that is, in the embodiment shown, parallel to the axis of the frame 1.

The first portion 21 is connected to the frame 1 by a first pivot 211 while a second pivot 212 provides the rotary connection between the first portion 21 of the arm 2 and a second horizontal portion 22.

The arm 2 is provided with a movement member 7 preferably consisting of an electric motor secured to the frame 1.

This movement member is coupled to a flexible movement-transmission member 8, shown in FIGS. 5 and 6.

The transmission member 8 comprises a set of two endless belts 81, 82 driven by the movement member 7. In the embodiment shown in FIG. 5, the belt 81 of the first portion 21 is firstly in engagement with the motor shaft 7 and secondly passes around the second pivot 212 forming a roller.

The belt 82 of the second portion for its part is engaged firstly on the second pivot 212 and secondly on a nut 45 for in the groove of a pulley or roller) carried by a threaded rod 46 secured to the actuator 4.

The actuator 4 is for its part associated with a motor 40 (FIGS. 1 and 6) and/or a jack and is provided with a stick 5 connected to the tool-holder 41. The chuck 5 is intended for the manual control of the tool 6 by an operator, as illustrated by FIG. 1.

The chuck 5 comprises a peripheral sleeve 51 for manual gripping.

The sleeve 51 is provided with a bottom cup 51a and a top cup 51b each receiving a return spring 52 surrounding the chuck 5, as illustrated by FIGS. 3 and 4.

The actuator 4 cooperates with a main force sensor 54 integrated in the chuck 5 that converts the crushing force on the springs 52 into an electrical signal with a view to controlling the vertical movement of the tool and the amplification of the manual forces exerted by the operator.

More precisely, the sensor 54 measures the vertical force exerted by the hand of the operator and, proportionally to the value of said force, controls the speed of the motor 7 of the actuator 4.

The bottom part of the chuck 5 enters the seat 41 coaxially with the tool 6 through a bore 45 where an auxiliary force sensor 56 is housed (see FIG. 4).

The auxiliary sensor 56 measures the compression force by the so-called "deformation gauge ring" technology exerted between the tool 6 and the actuator 4 via the tool-holder 41 in order to control the forces amplified by the chuck 5.

Thus the sensor 56 measures and controls the force actually applied by the tool 6 by comparing it with a set value determined previously according to the task to be executed. This method makes it possible to limit the forces applied and amplified by the actuator in a safe manner.

The equipment of the invention also comprises a first detector detecting the angular position of the first portion 21 coupled to a second detector detecting the angular position of the second portion 22. These detectors are intended to validate the movement of the linear actuator 4 and therefore of the tool in a given area confined in space, for the purposes of both safety and precision.

The implementation method thus comprises a first initialisation phase consisting of defining and validating a mapping in three dimensions of the work area able to be covered by the arm 2 and/or the tool 6.

Any subsequent movement of the arm 2 and/or of the tool 6 outside the previously defined area will then be made impossible by the intervention of detectors controlling the automatic locking of at least one of the directional means (movement member 7, transmission member 8, motor 40, band 44, etc.).

When necessary, the first detector is coupled to braking members acting on the first pivot 211 and/or the second pivot 212.

The end fitting 3 for connection between the second portion 22 and the actuator 4 for its part consists of a ball joint optionally provided with a brake.

Preferably, at least one of the pivots 211, 212 is motorised in order to compensate for the inertia of the portions 21, 22 and cushion the forces amplified by the chuck 5.

The linear actuator 4 shown in FIG. 6 is moved in translation by the motor 40 via a notched drive band 44 and at least one pinion 43 in engagement with the motor shaft.

The band 44 is secured to the tool-holder 41 and is enclosed in a vertical casing 42.

The invention claimed is:

1. Collaborative robotic equipment, comprising:
a frame supporting an arm movable along at least one axis and the end of which is provided with a tool, wherein the arm comprises a first horizontal portion, movable on a vertical axis and connected to the frame by a first pivot, a second pivot providing the rotary connection of a second horizontal portion to the first horizontal portion, an end fitting providing the connection of the second horizontal portion to a motorised tool-holding linear actuator that is provided with a manual control chuck cooperating with a main force sensor so as to control the vertical movement of the tool and the amplification of the manual forces.

2. The equipment according to claim 1, further comprising an auxiliary force sensor mounted between the actuator and the tool in order to control the forces amplified by the chuck.

3. The equipment according to claim 1, further comprising a first detector detecting the angular position of the first horizontal portion coupled to a second detector detecting the angular position of the second horizontal portion, the detectors validating the movement of the linear actuator.

4. The equipment according to claim 3, wherein the first detector is coupled to braking members acting on the first and second pivots.

5. The equipment according to claim 1, wherein the end fitting connecting the second horizontal portion and the actuator comprises a ball joint.

6. The equipment according to claim 1, wherein at least one of the first and second pivots is motorised in order to compensate for the inertia of the first and second horizontal portions and cushion the amplified forces.

7. The equipment according to claim 1, wherein the arm comprises a movement member secured to the frame.

8. The equipment according to claim 7, wherein the movement member is coupled to a flexible transmission member.

9. The equipment according to claim 8, wherein the flexible transmission member comprises a set of two endless belts in engagement respectively with the first and second pivots and cooperating with the first and second horizontal portions.

10. The equipment according to claim 1, wherein the frame comprises a pole provided with a fixing base.

* * * * *